United States Patent [19]
Vincent

[11] 3,880,241
[45] Apr. 29, 1975

[54] MULTIPLE-PIECE WING SECTIONS FOR CULTIVATOR AND OSCILLATION PREVENTING DEVICE FOR SAME

[75] Inventor: James H. Vincent, Sac City, Iowa

[73] Assignee: Royal Industries, Inc., Sac City, Iowa

[22] Filed: Dec. 18, 1972

[21] Appl. No.: 316,229

[52] U.S. Cl. .................. 172/311; 172/456; 16/147
[51] Int. Cl. ............................................ A01b 15/14
[58] Field of Search .......... 172/310, 311, 456, 667, 172/776; 280/411 A, 411 R, 412, 413; 16/147, DIG. 33; 24/73 HS, 249 PC

[56] References Cited
UNITED STATES PATENTS

| | | | |
|---|---|---|---|
| 1,721,288 | 7/1929 | Thiry | 16/DIG. 33 |
| 3,362,484 | 1/1968 | Walberg | 16/147 X |
| 3,398,674 | 8/1968 | Venable | 16/147 X |
| 3,414,064 | 12/1968 | Foster | 172/311 |
| 3,487,882 | 1/1970 | Burton | 172/310 |
| 3,700,040 | 10/1972 | Sosalla et al. | 172/311 |

Primary Examiner—Edgar S. Burr
Assistant Examiner—Paul T. Sewell
Attorney, Agent, or Firm—Hofgren, Wegner, Allen, Stellman & McCord

[57] ABSTRACT

An improved farm implement of the foldable, sectional tow type including a central section, including a wheeled cart and wing sections hingedly connected to the central section. Each of the wing sections is comprised of a plurality of hingedly connected frames to allow good ground coverage on abrupt terrain. The sections are further connected to the cart for movement between transport positions and cultivating positions and dampening means interconnect the various frames of the wing section and operable to preclude the same from oscillating relative to each other when in the transport position.

4 Claims, 4 Drawing Figures

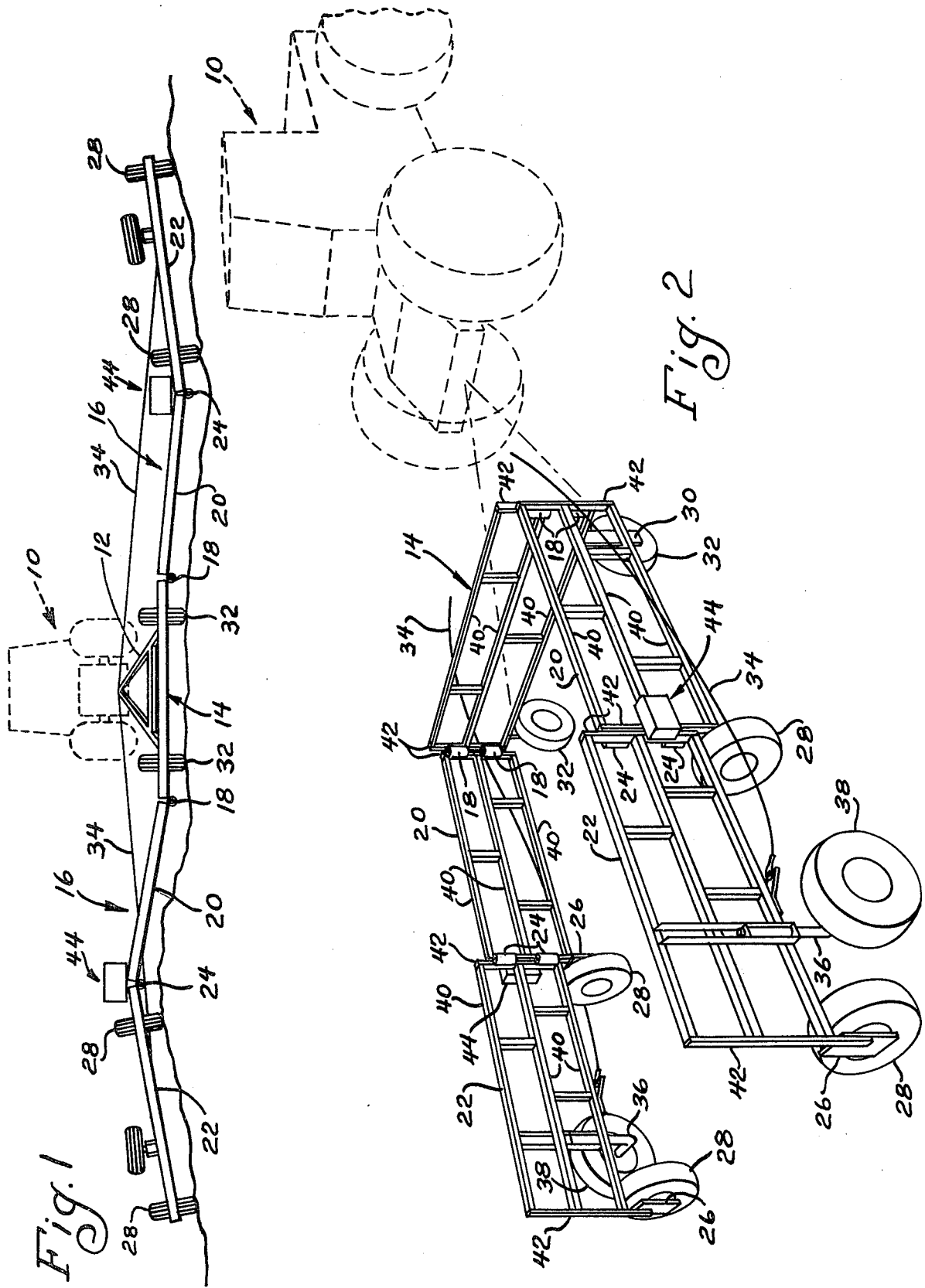

MULTIPLE-PIECE WING SECTIONS FOR CULTIVATOR AND OSCILLATION PREVENTING DEVICE FOR SAME

BACKGROUND OF THE INVENTION

This invention relates to a sectional, tow type implement cart which has a pair of outboard wing sections which are movable from a laterally extending operative position to a folded inoperative or transport position with the outboard wings extending generally parallel to the direction of travel and rearwardly of a center section.

The continuing trend in agricultural operations toward more efficient implements has resulted in a variety of commercially available foldable implement structures as, for example, spring tooth cultivators. Typically, such an implement will include a central section which may be cart mounted and have tools depending therefrom along with a pair of wing sections hingedly connected to the ends of the central section. The wing sections also include tools depending therefrom and increase the width of the swath made across the field by a farmer in one traverse of the field.

As is well known, as a practical matter it is impossible to move such an implement through the usual gates in the fences surrounding fields or along roads or highways to or from a field. As a result, most such implements provide a hinged connection between the central section and the cart so that the central section is pivoted on the cart for rotation about a horizontal axis. The construction is such that when the central section is pivoted upwardly on the cart, the wing sections will follow to a vertical position. With the central sections and the wing sections extending generally horizontally, continued forward movement of the cart will result in the wing sections falling in behind the cart and assuming a position generally parallel to the direction of travel. By making the central section of an appropriately narrow width, the resulting assemblage can easily be pulled through gate openings or along roads or highways.

Of course, in order to maximize the efficiency of a farming operation in employing such an implement, it is desirable to increase the length of the wing sections to thereby increase the swath covered in one traverse of a field. As a practical matter, it is impossible to increase the width of the swath by increasing the length of the central section since that is effectively limited by the width of gate openings and the maximum permissible width of the implement when in a transport position and moving down a public roadway.

To a lesser extent, the overall width of swath is limited by the maximum permissible length of each wing section as well. Specifically, in the constructions heretofore known, each wing section consists of a single rigid frame. As the length of each such frame is increased, when the implement is drawn across the usual somewhat uneven countour of a field, it will have a greater tendency to bridge a depression or become hung up on a mound. In either instance, the efficiency is lost in that the ground engaging tools will be elevated out of contact with the underlying ground so that the desired operation will not be performed thereon. Moreover, if the frame becomes hung up on a mound, continued force applied to the same by a prime mover such as a tractor may cause substantial damage to the work performing tools thereon and/or may necessitate manual effort on the part of the farmer to free the frame and the tools thereon from the mound.

Thus, the maximum width of swath of current implements of this type is practically limited by the foregoing factors.

SUMMARY OF THE INVENTION

It is the principal object of the invention to provide a new and improved foldable implement whereby a greater width of swath may be obtained than with currently known constructions. More specifically, it is an object of the invention to provide such an implement wherein the wing sections are non-rigid thereby allowing the same to conform to the underlying contour without appreciable bridging or hangup problems thereby allowing the length of the wing section to be increased to achieve a greater width of swath.

The exemplary embodiment of the invention achieves the foregoing objects in a construction wherein each wing section is fabricated of a plurality of individual, generally rigid frames, hingedly interconnected to each other. By reason of the hinge connection, portions of each wing section are movable relative to other portions to allow the wing sections to substantially conform to the contour of the underlying terrain.

According to a preferred embodiment, alternate frames of each wing section and a central frame are staggered in a direction parallel to the intended path of travel to preclude interference between tools mounted on each frame section.

The invention also contemplates the provision of means for precluding oscillation of the frames of each wing section when the implement is in transport. According to the preferred embodiment, a resilient dampening means is provided to effectively disable the hinges and rapidly dampen oscillation should it begin to occur.

A preferred form of an oscillation dampening means includes upstanding tongues on adjacent side members of the frames comprising a wing section and having a rod or shaft passing through aligned apertures therein. Between the two tongues and about the rod is a first resilient element while a second resilient element is located on the opposite side of one of the tongues and about the rod or shaft. Retaining means holding the resilient elements in the foregoing relation with a result that as one frame pivots toward and away from the other, one or the other of the resilient elements will be stressing. Such stressing dampens oscillation of the frames when the frames are in the transport position.

The resilient elements may take on the form of any of a variety of known resilient devices, such as coil springs, but are preferably formed of one or more disks of polyurethane or the like.

Other objects and advantages will become apparent from the foregoing specification taken in conjunction with the accompanying drawings.

DESCRIPTION OF THE DRAWINGS

FIG. 1 is a perspective view of an implement made according to the invention with the implement supporting sections in a work performing position;

FIG. 2 is a perspective view of the implement with the sections in a transport position;

DESCRIPTION OF THE PREFERRED EMBODIMENT

Figure 3:
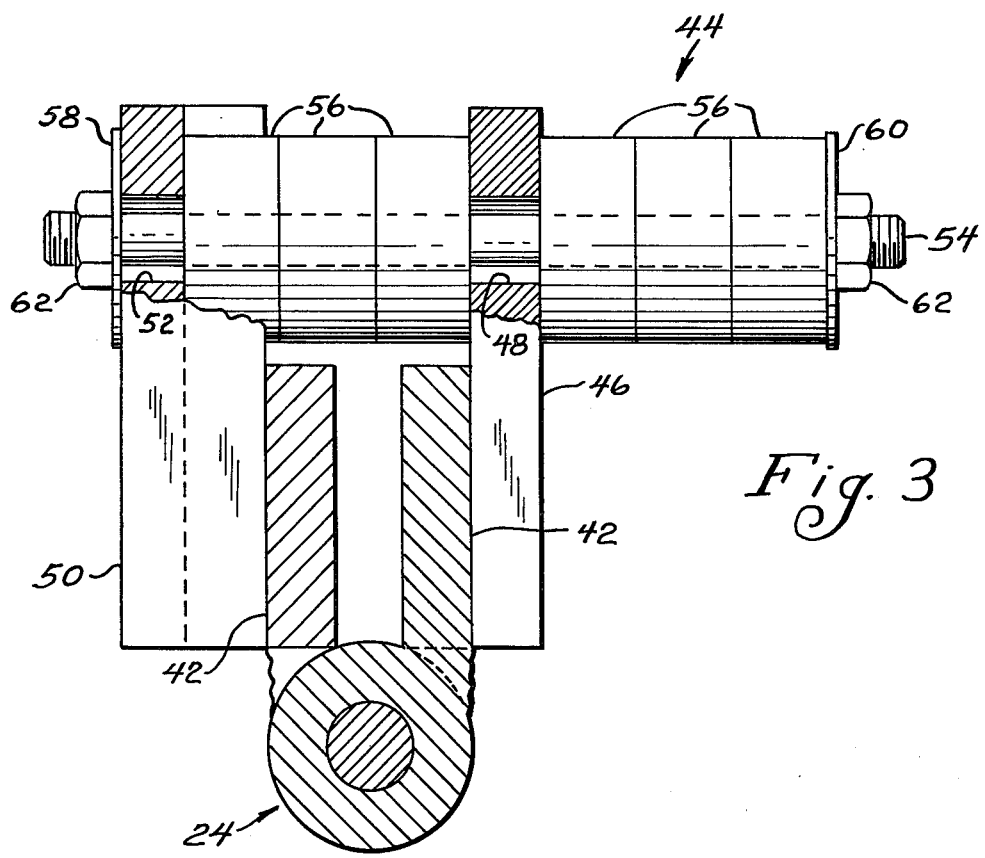
FIG. 3 is an enlarged side elevation of a dampening means with parts broken away for clarity.

An exemplary embodiment of the invention is illustrated in FIGS. 1 and 2 as being pulled by a tractor, generally designated 10, shown in dotted lines. As best seen in FIG. 1, the implement includes a conventional drawbar 12 which may also form a portion of the frame of a cart.

At the rearward end of the drawbar 12 forming the cart, a central implement supporting section, generally designated 14, may be mounted for pivotal movement about a horizontal axis by conventional means (not shown) between a generally horizontal work performing position (FIG. 1) and a generally vertical transport position (FIG. 2). The length of the central section 14 will be dictated by practical consideration such as maximum permitted overall width of the tractor and tow in moving down roadways, width of gates, etc. As is well-known, ground engaging tools as spring toothes (not shown) are secured to the section 14 to depend therefrom.

Hingedly connected to opposite ends of the central section 14 are wing sections, generally designated 16. The connections are established by hinges 18 as is well-known. According to the exemplary embodiment, each of the wing sections 16 is formed of a pair of frames, the inboard frame being designated 20 and the outboard frame being designated 22. The two frames 20 and 22 at their point of adjacency are hingedly connected by hinges 24 and like the section 14 are adapted to support depending tools (not shown).

The outboard ends of each of the frames 20 and 22 include forwardly projecting arms 26 which journal wheels 28. Similar arms 30 on the central section 14 journal wheels 32 and as may be appreciated from an inspection of FIG. 1, the wheels 28 and 32 support the entire implement including the central section 14 and the wing sections 16 when the sections are in the work performing position.

To provide a support for the outboard ends of the wings when in the work performing position, cables 34 extending from the drawbar 12 to the outboard frames 22 are employed. The cables are provided with any suitable releasable means to allow folding of the wing sections for transport.

Each of the outboard frames 22, near its outboard end, includes a forwardly projecting wheel mount 36 which in turn journals a respective wheel 38. The arrangement is such that the forwardmost portion of the wheel 38 is ahead of the forwardmost portion of the wheels 28 so that when the sections are rotated to a transport position, i.e., vertical, the wheels 38 will engage the ground while elevating the wheels 28 above the ground. As can be seen in FIG. 2, when the device is in the transport position, the same is supported by the wheels 32 and 38.

As can also be seen in FIG. 2, each of the frames or sections includes plural frame members 40 connected together at their respective ends by end rails 42. The hinges 24 and 18 are, in turn, connected to the end rails and preferably the arrangement is such that the various sections or frames are staggered with respect to each other as illustrated in FIG. 2. That is, when in the working position, the central section 14 will be somewhat rearwardly of the inboard frames 20 as will be the outboard frames 22. Since, as is well-known, ground engaging tools (not shown) are supported by the frame members 40, the foregoing staggered arrangement precludes tools on adjacent ones of the frame support sections from engaging one another when they pivot relative to each other about the hinges 24 or 18.

Because when the implement is in the transport position, and the trailing or wing sections 16 are jointed by the hinges 24 between the frames 20 and 22, it will be appreciated that some relative movement therebetween may occur. That is, the two frames 20 and 22 will oscillate relative to each other. To preclude such oscillation during transport, lock means, generally designated 44, interconnect the side rails 42 of the frames 20 and 22 at their point of adjacency.

Figure 4:
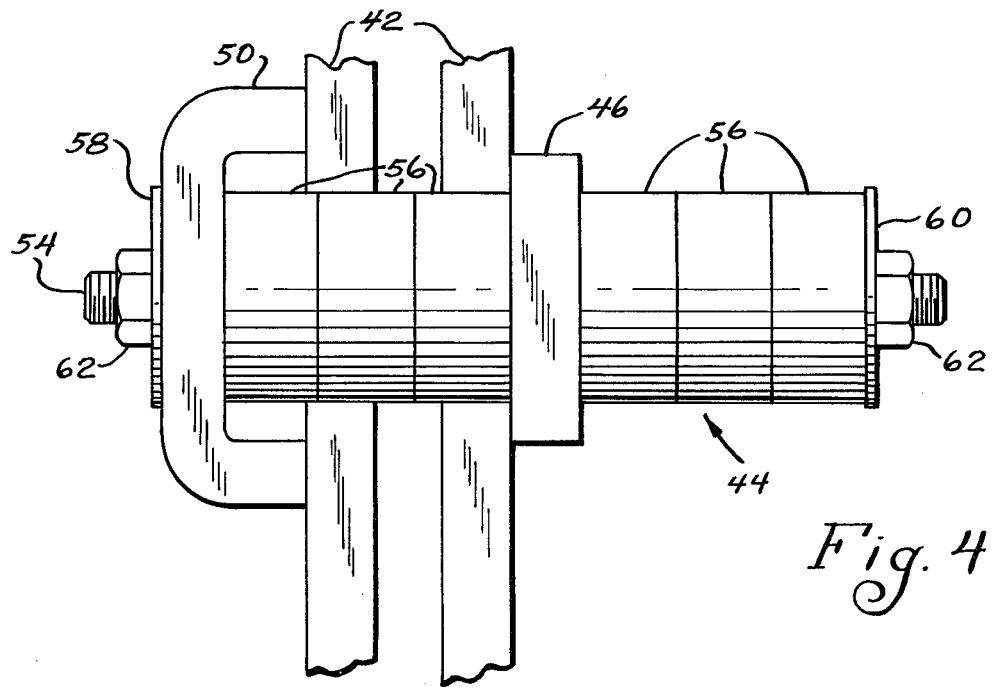
FIG. 4 is a plan view of the dampening means.

Turning now to FIGS. 3 and 4, the locking means 44 are shown in greater detail. One of the end rails 42 on the frames 20 and 22 includes an upstanding tongue 46 secured thereto by any suitable means. Near its uppermost end, the tongue 46 includes a vertically elongated aperture 48. The adjacent rail 42 on the sections 20 and 22 mounts an upstanding channel 50 which opens to face the tongue 46. The upper end of the base of the channel 50 also includes a vertically elongated aperture 52.

An elongated, threaded rod 54 extends through the apertures 48 and 52 and impales a plurality of resilient, doughnut-shaped elements 56. According to the preferred embodiment, the elements 56 may be formed of polyurethane or the like but it should be understood that any resilient material providing substantial resistance to deformation including metallic springs can be substituted therefor.

According to the preferred embodiment, several of the doughnut elements 56 are interposed between the base of the channel 50 and the adjacent face of the tongue 46 while a second plurality of doughnut elements 56 are adjacent the opposite face of the tongue 46. To hold the same in the configuration illustrated in FIG. 3, the rod 54 adjacent its ends impales a washer 58 in abutment with the base of the channel 50 and a washer 60 in abutment with the rightmost end of the rightmost doughnut element 56. Nuts 62 hold the washers 58 and 60 in place. Preferably, the nuts 62 are sufficiently tight so that there is no slack in the assemblage and in most instances, it is desirable that all of the elements 56 be under some compression.

From FIG. 3, it will be recognized that pivotal movement of the side rails 42 relative to each other, and thus the frames 20 and 22 will result in the compression of one of the sets of the plurality of doughnut elements 56. For example, if the side rails 42 are rotated about the pivot axis of the hinge 24 in a direction towards each other, as would be the case when the implement passes over a depression, the first plurality of doughnut elements 56 interposed between the channel 50 and the tongue 48 will be compressed while if the opposite direction of rotation were to take place, the second plurality of doughnut elements 56 to the right of the tongue 46 would be compressed. When the frames and sections are in the working position as shown in FIG. 1, such movement will take place since the weight of the frames will be such as to overcome the resistive compressive forces. However, when the frames are in the transport position as illustrated in FIG. 2, the fact that resistive forces due to compression of either set of the plurality of elements will exist any time the frames tend to rotate from a position wherein their side rails 42 are generally parallel as illustrated in FIG. 3 will tend to maintain the frames 20 and 22 in a generally planar configuration and prevent the undesired oscillation. Moreover, should the terrain over which the implement is towed when in the transport position cause some variation from a planar configuration of the two frame members 20 and 22, the resistive compressive forces will quickly cause the planar configuration to be restored and at the same time, tend to dampen out inertial forces tending to perpetuate any such oscillation.

From the foregoing, it will be appreciated that the invention provides for automatic maintenance of a desired configuration of the flexible wing sections 16 when in a transport position without requiring any positive action on the part of a farmer in connection with the changing of the implement configuration from the work performing position to the transport position.

I claim:

1. A farm implement of the foldable, sectional tow type comprising a wheeled cart bearing a central tool supporting section and mounting said central section for movement about a generally horizontal axis between a work performing position and a transport position; a pair of tool supporting wing sections, one on each side of said central section, each wing section being hingedly connected to said central section and movable therewith between said transport position and said work performing position, each of said wing sections being flexible so as to permit movement of at least one portion of each wing section relative to another portion thereof to allow said wing sections, when in the work performing position, to flex to conform to the contour of the underlying terrain whereby the length of each wing section can be maximized to thereby maximize the width of swath of the implement when said central section and said wing sections are in said work performing position; and means on each of said wing sections and interconnecting said portions for dampening oscillation between said portions when said wing sections are in said transport position while allowing said portions to flex when said wing sections are in said work performing position, each dampening means includes a pair of resilient elements one adapted to be compressed when said portions move relative to each other in one direction, the other adapted to be compressed when said portions move relative to each other in a direction opposite said one direction.

2. A farm implement of the foldable sectional tow type comprising: a wheeled cart; a central frame adapted to mount ground working tools pivotally mounted on said wheeled cart for movement between a generally horizontal work performing position and a generally vertical, transport position; a pair of wing sections, one on each side of said central frame; hinge means pivotally connecting each of said wing sections to the adjacent side of said central section whereby said wing sections may move between said generally horizontal work performing position and said generally vertical transport position with said central section; each of said wing sections being defined by a plurality of frames each adapted to mount ground engaging, work performing tools; additional hinge means hingedly interconnecting the frames of each wing section to permit relative movement therebetween about a generally horizontal axis extending approximately parallel to the direction of travel of said implement when said frames are in said work performing position; and means resiliently interconnecting the frames of each wing section for substantially precluding said wing section frames from oscillating relative to each other when said sections are in said generally vertical transport position by dampening oscillatory movement while allowing said frames of each wing section to undergo said relative movement when in said work performing position, said resilient means comprising pairs of resilient elements, each pair of resilient elements being located at a respective juncture of two frames of each wing section, and means at each said juncture for (a) compressing one of the associated resilient elements when said frames pivot in one direction relative to each other and (b) compressing the other of the associated resilient elements when said frames pivot in the opposite direction relative to each other.

3. The implement of claim 2 wherein said compressing means include mounting means on each of the frames at each juncture thereof and displaced to the side of the pivot axis of the associated additional hinge means and having aligned apertures, a shaft extending through the apertures and impaling said pair of resilient elements such that one element of said pair of resilient elements is sandwiched between said mounting means and the other element is on the side of one of the mounting means opposite said one element, means flexibly connecting said shaft to the other of said mounting means, and means on said shaft captivating said other element thereon.

4. The implement of claim 3 wherein each of said resilient elements comprises at least one doughnut-shaped resilient plastic disc.

* * * * *